United States Patent [19]
Nicholls

[11] 3,854,710
[45] Dec. 17, 1974

[54] MOTOR-CYCLE SUSPENSIONS
[75] Inventor: Lawrence George Nicholls, Birmingham, England
[73] Assignee: Girling Limited, Birmingham, England
[22] Filed: Dec. 16, 1971
[21] Appl. No.: 208,794

[30] Foreign Application Priority Data
Dec. 29, 1970 Great Britain..................... 61667/70

[52] U.S. Cl...... 267/64 R, 267/DIG. 1, 267/DIG. 2, 280/124 F
[51] Int. Cl............................................. B60g 11/26
[58] Field of Search .......... 267/64 R, 64 B, DIG. 1, 267/DIG. 2, 64 A; 280/124 F, 6 H

[56] References Cited
UNITED STATES PATENTS
1,792,794  2/1931  Zoelly ............................... 267/64 R
2,405,733  8/1946  Boldt ................................ 267/64 R
3,021,153  2/1962  Dickinson ..................... 267/DIG. 2

Primary Examiner—Robert J. Spar
Assistant Examiner—Lawrence J. Oresky
Attorney, Agent, or Firm—Scrivener Parker Scrivener and Clarke

[57] ABSTRACT

A suspension system for motorcycles including an air pressure operated hydraulic ram connected between the wheels and body of the motorcycle. Instead of applying air pressure from a separate source to counteract heavy loads on the motorcycle and then releasing this pressure to atmosphere after removing the load, an adjustable volume chamber is provided wherein the air pressure acting on the ram may be raised or lowered by increasing or decreasing the volume of the chamber thus eliminating the need to release excess pressure to atmosphere or to replenish the pressure from an outside source everytime the load on the cycle is changed.

10 Claims, 6 Drawing Figures

MOTOR-CYCLE SUSPENSIONS

This invention relates to motor cycle suspension systems and particularly to suspension systems which are adjustable to accommodate variations in load on the system.

Previously known adjustable suspension systems have either required a prime mover to provide power to keep the system charged, or they have required dissipation of the energy within the system with each adjustment of the suspension.

The invention provides a motor cycle suspension system comprising a sealed oleo/pneumatic unit and means for varying the pressure within the unit to accomodate variations in load on the system. Such a system has the advantages that it avoids the use of a prime mover as a source of pressure for the system and the need to dissipate pressure fluid to effect pressure reduction when the suspension is adjusted.

Adjustment of the system is effected by increasing or decreasing the volume of the air space within the oleo/pneumatic unit, either manually or automatically, in dependence upon variations in the load on the suspension.

Some forms of motor cycle suspension systems in accordance with the invention will now be described, by way of example only, with reference to the accompanying drawings in which.

Figure 1:
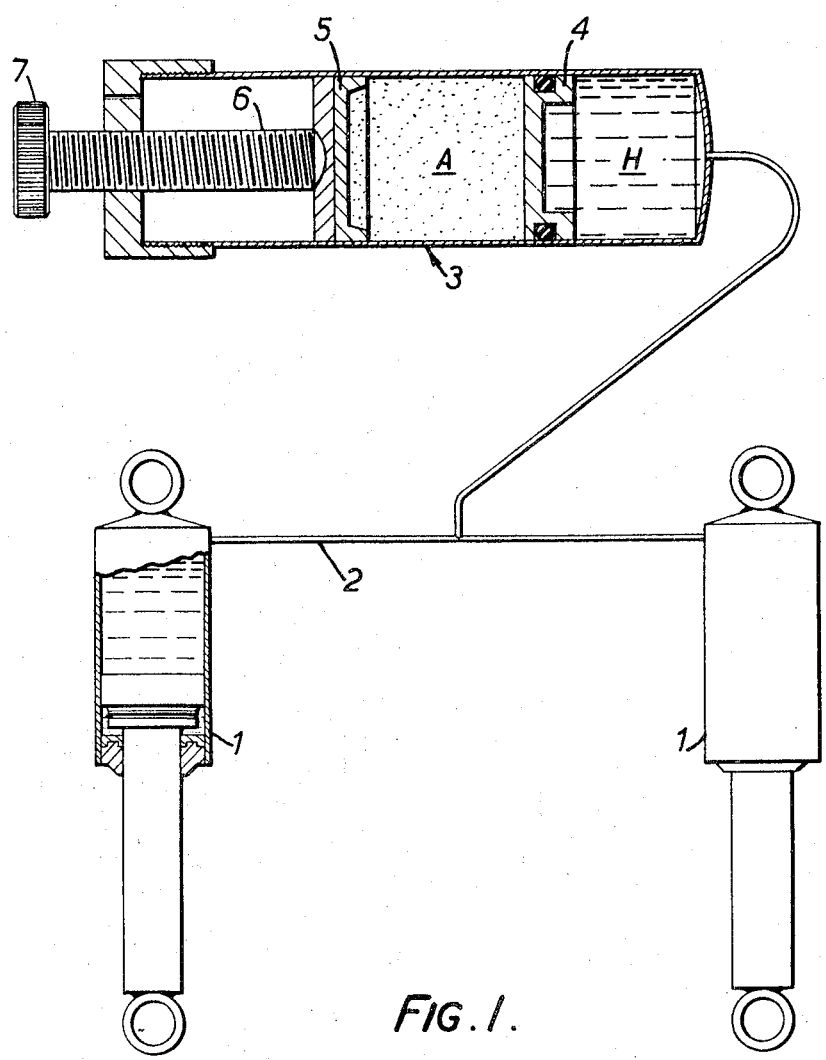
FIGS. 1 and 2 show two forms of rear suspension, partly in section.

The rear suspension shown in FIG. 1 comprises a pair of hydraulic rams 1 connected by common piping 2 to an accumulator 3 having a separating piston 4 movable axially of the accumulator body and serving to separate an hydraulic reservoir space H from an air space A a pressurising piston 5 is movable axially within the accumulator body by means of a screwed rod 6 threaded through a fixed end cap and having at its outer end a hand wheel 7. The volume of the air space can thus be adjusted manually to provide a desired pressure which is transmitted by the piston 4 to the hydraulic part of the system.

Figure 2:
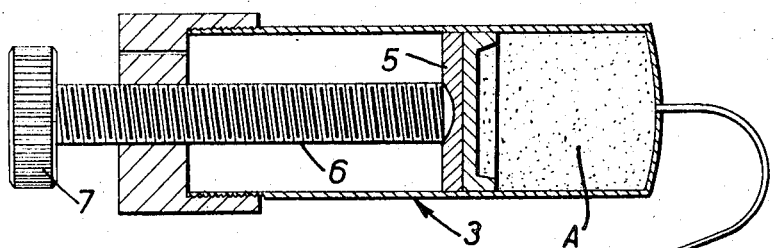
Figure 2:
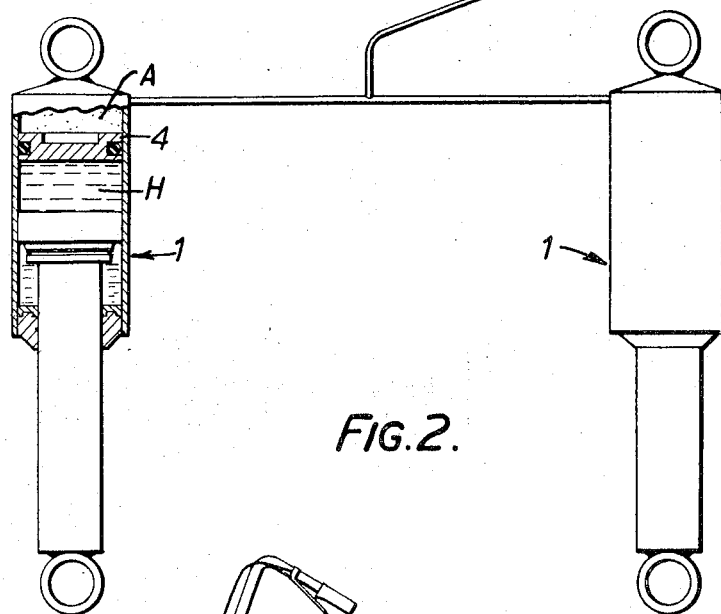

The suspension of FIG. 2 is generally similar, but the separating pistons 4 are located in the cylinder spaces of the individual rams 1, the accumulator 3 acting merely as an air reservoir.

Figures 3, 6:
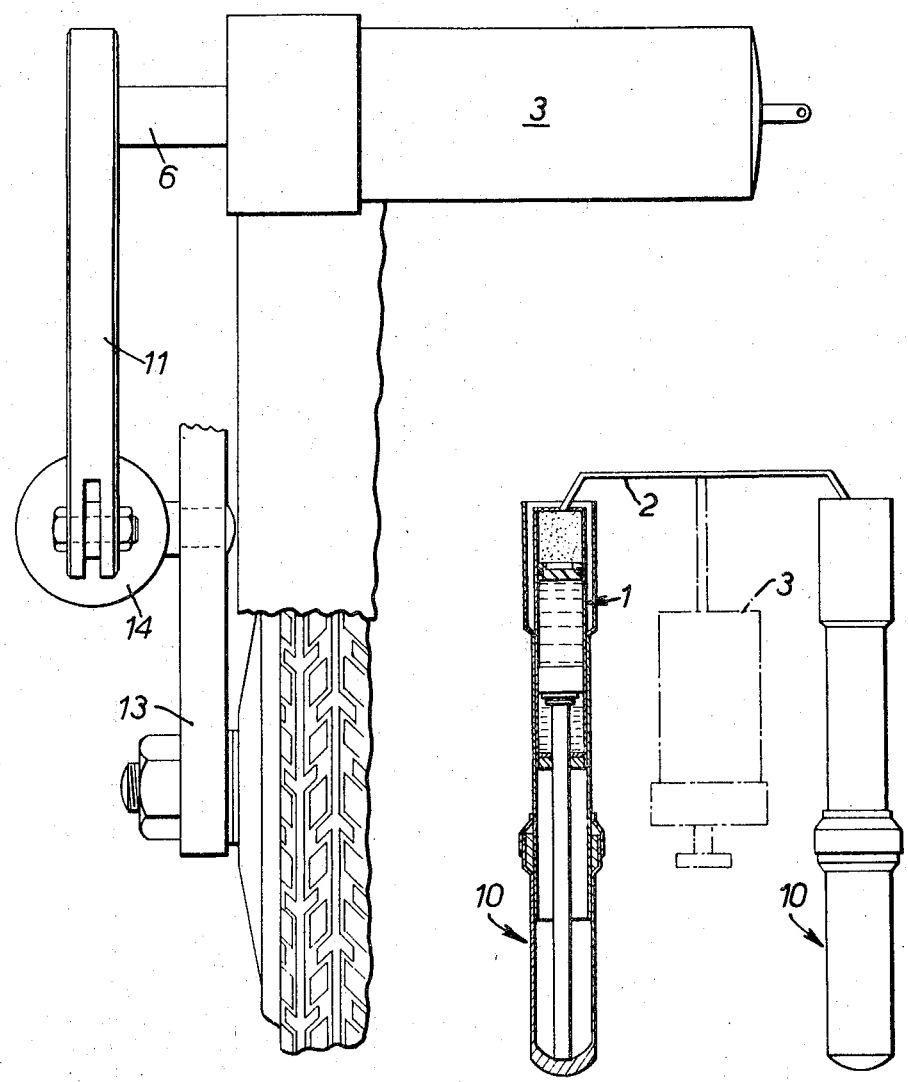
FIG. 3 shows one form of front suspension, partly in section.
FIG. 6 is a plan view of the suspension of FIG. 5.

Shown in FIG. 3 is a system like that of FIG. 2, but constructed for incorporation in the front forks 10 of a motor cycle.

Figure 4:
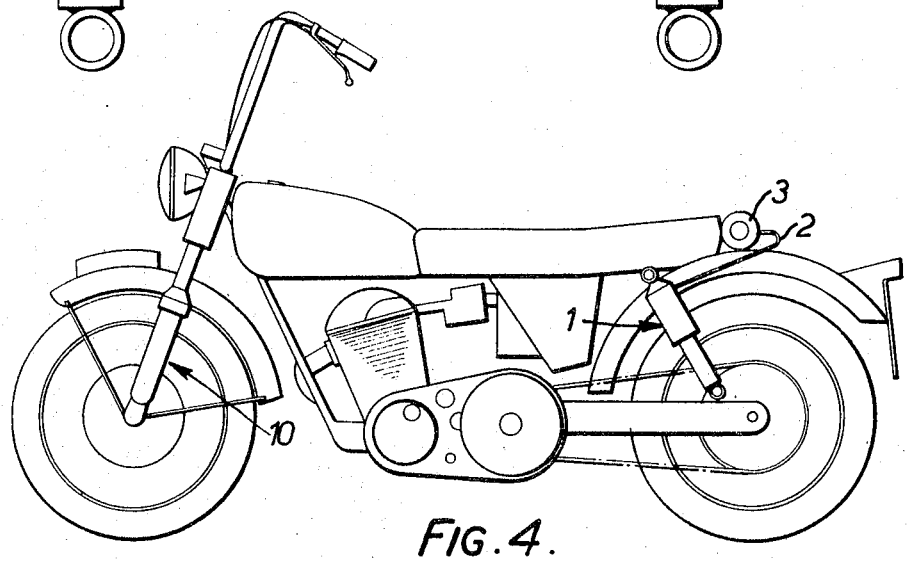
FIG. 4 shows a motor cycle incorporating front and rear suspensions in accordance with the invention.

FIG. 4 shows a motor cycle incorporating the front suspension of FIG. 3 and the rear suspension of either FIG. 1 or FIG. 2.

In each of the above embodiments the pistons of the rams may be fitted with damping valves.

Figure 5:
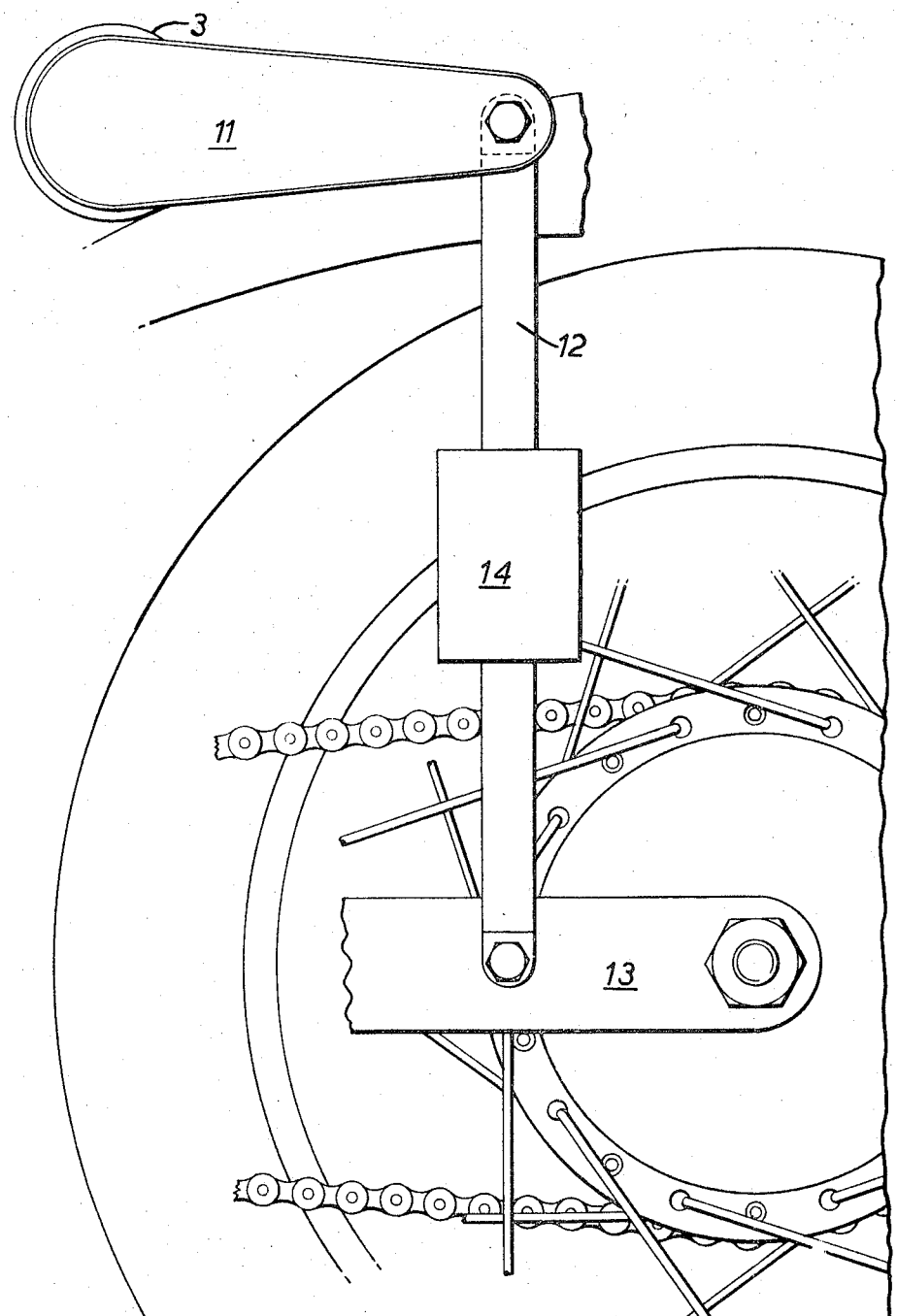
FIG. 5 is a side view showing another form of rear suspension.

FIGS. 5 and 6 illustrate one form of automatically adjustable system, in which the screwed rod 6 of the accumulator pressurising piston has secured to it a lever 11 connected in use by a strut 12 to a swinging arm 13 of the motor cycle. Preferably, and as shown, the strut 12 is in two parts connected through the intermediary of a suitable conventional shock absorber valve 14, which serves as a delay device in order to reduce the sensitivity of the system to transient variations in loading.

This system, with its low rate suspension and load compensation provides improved road holding and rider comfort at little extra expense compared with conventional suspensions.

If desired, the accumulator 3 can be fitted with a pressurising valve to allow the unit to be recharged or topped up during its working life. It will be appreciated that the spring rate of the system can be predetermined by initial design of the accumulator, in particular by design of its cross-sectional area relative to the sum of the areas of the piston in the respective damper units.

I claim:

1. A motorcycle suspension system including an hydraulic ram connected between a wheel part and a body part of a motorcycle, said ram including a cylinder connected to one of the parts for movement therewith and a fluid pressure responsive piston including a rod connected to the other part for movement therewith, means for adjusting the pressure acting on said piston comprising means defining an air pressure space and a hydraulic pressure space, said hydraulic pressure space directly communicating with the piston of said ram, a first selectively moveable fluid tight member constituting an end wall of said air pressure space, a second moveable fluid tight partition wall separating said hydraulic and air pressure spaces, and position-varying means for selectively moving said end wall of said air pressure space to adjust the volume of said air pressure space and consequently the pressure within both said spaces to control the hydraulic pressure force acting on the piston of said ram.

2. A system according to claim 1, wherein said means defining said air pressure space includes an air reservoir body, and said means defining said hydraulic pressure space includes said hydraulic ram.

3. A system according to claim 2, wherein said ram is one of a pair of such rams defining respective hydraulic pressure spaces, and a fluid communication with each other and with said reservoir.

4. A system according to claim 3, wherein said system includes a further pair of hydraulic rams in fluid flow communication with said reservoir.

5. A system according to claim 3, wherein said reservoir body includes a fixed wall having a screw threaded aperture therein, and wherein said position-varying means comprises a rod in screw threaded engagement with said aperture and operably connected to said movable end wall for moving the same.

6. A system according to claim 5, further comprising a strut having one end which is adapted to be connected to a swinging arm of a motor cycle, and a lever having one end connected to said screw-threaded rod and having the other end pivotally connected to said strut at the end remote from said one end.

7. A system according to claim 6, wherein said strut is in two parts, and further comprising conventional schock absorber means connected between said two parts of said strut.

8. A system according to claim 3, wherein said movable end wall is in the form of a piston slidable in said reservoir body and displaceable by said position-varying means to vary the volume of said air pressure space and thereby vary the air pressure.

9. A system according to claim 3, wherein said partition wall is one of two such partition walls constituted by a pair of free pistons respectively slidable in said hydraulic rams.

10. A system according to claim 3, wherein said partition wall is constituted by a free piston slidable within said reservoir body.

* * * * *